US012634959B2

(12) United States Patent
Yu et al.

(10) Patent No.:  US 12,634,959 B2
(45) Date of Patent:  May 19, 2026

(54) METHODS AND APPARATUS FOR SIDELINK COMMUNICATION

(71) Applicant: Lenovo (Beijing) Limited, Beijing (CN)

(72) Inventors: Xiaodong Yu, Beijing (CN); Zhennian Sun, Beijing (CN); Haipeng Lei, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 332 days.

(21) Appl. No.: 18/249,887

(22) PCT Filed: Oct. 22, 2020

(86) PCT No.: PCT/CN2020/122759
§ 371 (c)(1),
(2) Date: Apr. 20, 2023

(87) PCT Pub. No.: WO2022/082585
PCT Pub. Date: Apr. 28, 2022

(65) Prior Publication Data
US 2023/0397230 A1      Dec. 7, 2023

(51) Int. Cl.
*H04W 72/25*      (2023.01)
*H04L 5/00*      (2006.01)

(52) U.S. Cl.
CPC ........... *H04W 72/25* (2023.01); *H04L 5/0055* (2013.01)

(58) Field of Classification Search
None
See application file for complete search history.

(56) References Cited

U.S. PATENT DOCUMENTS

2020/0305126 A1\*   9/2020   Li ......................... H04L 1/1614
2022/0022179 A1\*   1/2022   Fouad ................... H04W 72/02
(Continued)

FOREIGN PATENT DOCUMENTS

CN          111345100 A      6/2020
WO       2020051911 A1      3/2020
(Continued)

OTHER PUBLICATIONS

Fraunhofer HHI , et al., "Resource Allocation Enhancements for Mode 2", 3GPP TSG RAN WG1 Meeting #102-e, R1-2005537, e-Meeting [retrieved May 23, 2023]. Retrieved from the Internet <https://www.3gpp.org/ftp/TSG_RAN/WG1_RL1/TSGR1_102-e/Docs>., Aug. 2020, 8 Pages.
(Continued)

*Primary Examiner* — The Hy Nguyen
(74) *Attorney, Agent, or Firm* — FIG. 1 Patents

(57)      ABSTRACT

Embodiments of the present disclosure relate to methods and apparatus for sidelink communication. According to an embodiment of the present disclosure, a method performed by a first user equipment (UE) for wireless communication may include: receiving a sidelink transmission including a first indication to indicate whether a second UE has an ability of providing assistant information for resource selection; and in response to the first indication indicating that the second UE has the ability of providing the assistant information, transmitting a request for the assistant information on one or more feedback resources associated with the sidelink transmission.

20 Claims, 4 Drawing Sheets

(56) References Cited

U.S. PATENT DOCUMENTS

| | | | | | |
|---|---|---|---|---|---|
| 2022/0116925 | A1* | 4/2022 | Fouad | .................... | H04W 72/51 |
| 2023/0084999 | A1* | 3/2023 | Selvanesan | ....... | H04W 52/0216 |
| | | | | | 370/329 |
| 2023/0136864 | A1* | 5/2023 | Lei | ........................ | H04L 5/0055 |
| | | | | | 370/329 |
| 2023/0171738 | A1* | 6/2023 | Di Girolamo | ........ | H04W 72/56 |
| | | | | | 370/329 |
| 2023/0209412 | A1* | 6/2023 | Liu | ......................... | H04W 4/40 |
| | | | | | 370/329 |
| 2023/0379887 | A1* | 11/2023 | Zhao | ..................... | H04W 72/02 |
| 2024/0023138 | A1* | 1/2024 | Zhao | ..................... | H04L 5/0053 |

FOREIGN PATENT DOCUMENTS

| | | | |
|---|---|---|---|
| WO | 2021207459 | A1 | 10/2021 |
| WO | WO-2022027588 | A1 * | 2/2022 |

OTHER PUBLICATIONS

LG Electronics , "Discussion on resource allocation for NR sidelink Mode 2", 3GPP TSG RAN WG1 #96bis, R1-1905439, Xi'an, China [retrieved May 23, 2023]. Retrieved from the Internet <https://www.3gpp.org/ftp/tsg_ran/WG1_RL1/TSGR1_96b/Docs>., Apr. 2019, 11 Pages.

Nokia , "Discussion of Resource Allocation for Sidelink—Mode 2", 3GPP TSG RAN WG1 Meeting #96bis, R1-1905334, Xi'an, China [retrieved May 23, 2023]. Retrieved from the Internet <https://www.3gpp.org/ftp/tsg_ran/WG1_RL1/TSGR1_96b/Docs>., Apr. 2019, 9 Pages.

PCT/CN2020/122759 , "International Preliminary Report on Patentability", PCT Application No. PCT/CN2020/122759, May 4, 2023, 5 pages.

PCT/CN2020/122759 , "International Search Report and Written Opinion", PCT Application No. PCT/CN2020/122759, Jul. 21, 2021, 6 pages.

20958168.5 , "European Search Report", Application No. 20958168.5, Jun. 10, 2024, 12 pages.

Ericsson , "Feasibility and benefits of mode 2 enhancements for inter-UE coordination", 3GPP TSG-RAN WG1 Meeting #102-e R2-2006445 3rd Generation Partnership Project (3GPP), Mobile Competence Centre ; 650, Route Des Lucioles; F-06921 Sophia-Antipolis Cedex; France, Aug. 17, 2020, 7 pages.

Fujitsu , "Considerations on inter-UE coordination for mode 2 enhancements", 3GPP Draft; R1-2005546, 3rd Generation Partnership Project (3GPP), Mobile Competence Centre; 650, Route Des Lucioles ; F-06921 Sophia-Antipolis Cedex; France, vol. RAN WG1, Aug. 2020, 11 pages.

Qualcomm Incorporated , "Reliability and Latency Enhancements for Mode 2", 3GPP TSG RAN WG1 Meeting #102-e R1-2006829, 3rd Generation Partnership Project (3GPP), Mobile Competence Centre; 650, Route Des Lucioles; F-06921 Sophia-Antipolis Cedex; France, Aug. 17, 2020, 9 pages.

"Communication under Rule 71(3) EPC", EP Application No. 20958168.5, Apr. 29, 2025, 68 pages.

Foreign Office Action issued in KR Application No. 2023-7013338, mailed Nov. 24, 2025, 15 pages.

Moderator (LG Electronics), "Summary for AI 8.11.2.2 Feasibility and benefits for mode 2 enhancements", 3GPP TSG RAN WG1 #102-E, R1-2007412, Aug. 2020, 33 pages.

ZTE et al., "Inter UE coordination in mode 2", 3GPP TSG RAN WG1 #102-E, R1-2005961, e-Meeting, Aug. 2020, 3 pages.

* cited by examiner

METHODS AND APPARATUS FOR SIDELINK COMMUNICATION

TECHNICAL FIELD

Embodiments of the present disclosure are related to wireless communication technologies, and more particularly, related to methods and apparatuses for sidelink communication.

BACKGROUND

In new radio (NR) sidelink communication, a user equipment (UE) operating in mode 2 autonomously selects sidelink resource(s) for performing a sidelink transmission from a resource pool which contains sidelink resource(s) configured by a base station (BS) or pre-configured in standards. The UE normally performs a sensing and resource selecting procedure to select and/or reserve resource(s) for the sidelink transmission. For a UE which does not perform sensing prior to a trigger of resource selection or needs assistant information for resource selection (e.g., to avoid the hidden-node or half-duplex issue), a solution for requesting or obtaining sensing result(s) or assistant information from other UE(s) is needed.

SUMMARY OF THE DISCLOSURE

According to some embodiments of the present disclosure, a method performed by a first UE for wireless communication may include: receiving a sidelink transmission including a first indication to indicate whether a second UE has an ability of providing assistant information for resource selection; and in response to the first indication indicating that the second UE has the ability of providing the assistant information, transmitting a request for the assistant information on one or more feedback resources associated with the sidelink transmission.

In an embodiment of the present disclosure, the first indication can be one bit in a sidelink control information (SCI) format in the sidelink transmission.

In an embodiment of the present disclosure, the one or more feedback resources may have at least one of (1) a pre-defined or pre-configured frequency domain offset or (2) a pre-defined or pre-configured time domain offset, with respect to a feedback resource for hybrid automatic repeat request (HARQ) acknowledgement/non-acknowledgement (ACK/NACK) information associated with the sidelink transmission. In another embodiment of the present disclosure, the one or more feedback resources can be one or more feedback resources for HARQ ACK/NACK information associated with the sidelink transmission.

In an embodiment of the present disclosure, the one or more feedback resources may correspond to a traffic priority level or a packet size of the first UE.

In an embodiment of the present disclosure, the sidelink transmission may further include a second indication to indicate one or more reserved resources. The method may further include receiving, on at least one reserved resource of the one or more reserved resources, the assistant information in response to the request. The method may further include receiving a third indication to indicate that the assistant information is transmitted on the at least one reserved resource. The third indication can be one bit in an SCI format. In an embodiment of the present disclosure, the assistant information can be received in a pre-defined or pre-configured portion of the at least one reserved resource.

According to some embodiments of the present disclosure, a method performed by a first UE for wireless communication may include receiving a sidelink transmission including assistant information for resource selection, wherein the sidelink transmission may further include an indication to indicate that the assistant information is transmitted in the sidelink transmission.

In an embodiment of the present disclosure, the indication can be one bit in an SCI format in the sidelink transmission. The assistant information can be received in a pre-defined or pre-configured portion of the sidelink transmission.

According to some embodiments of the present disclosure, a method performed by a second UE for wireless communication may include: transmitting a sidelink transmission including a first indication to indicate whether the second UE has an ability of providing assistant information for resource selection; and in response to the first indication indicating that the second UE has the ability of providing the assistant information, receiving, from a first UE, a request for the assistant information on one or more feedback resources associated with the sidelink transmission.

In an embodiment of the present disclosure, the first indication can be one bit in a sidelink control information (SCI) format in the sidelink transmission.

In an embodiment of the present disclosure, the one or more feedback resources may have at least one of (1) a pre-defined or pre-configured frequency domain offset or (2) a pre-defined or pre-configured time domain offset, with respect to a feedback resource for HARQ ACK/NACK information associated with the sidelink transmission. In another embodiment of the present disclosure, the one or more feedback resources can be one or more feedback resources for HARQ ACK/NACK information associated with the sidelink transmission.

In an embodiment of the present disclosure, the one or more feedback resources may correspond to a traffic priority level or a packet size of the first UE.

In an embodiment of the present disclosure, the sidelink transmission may further include a second indication to indicate one or more reserved resources. The method may further include transmitting, on at least one reserved resource of the one or more reserved resources, the assistant information in response to the request. The method may further include transmitting a third indication to indicate that the assistant information is transmitted on the at least one reserved resource. The third indication can be one bit in an SCI format. In an embodiment of the present disclosure, the assistant information can be transmitted in a pre-defined or pre-configured portion of the at least one reserved resource.

According to some embodiments of the present disclosure, a method performed by a second UE for wireless communication may include transmitting a sidelink transmission including assistant information for resource selection, wherein the sidelink transmission may further include an indication to indicate that the assistant information is transmitted in the sidelink transmission.

In an embodiment of the present disclosure, the indication can be one bit in an SCI format in the sidelink transmission. The assistant information can be transmitted in a pre-defined or pre-configured portion of the sidelink transmission.

According to other embodiments of the present disclosure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instructions may cause the at least processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In the following description, numerous specific details are provided, such as examples of programming, software modules, network transactions, database structures, hardware modules, hardware circuits, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference will now be made in detail to some embodiments of the present disclosure, examples of which are illustrated in the accompanying drawings. To facilitate understanding, embodiments are provided under specific network architecture and new service scenarios, such as 3rd Generation Partnership Project (3GPP) 5G, 3GPP Long Term Evolution (LTE) and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

Figure 1:
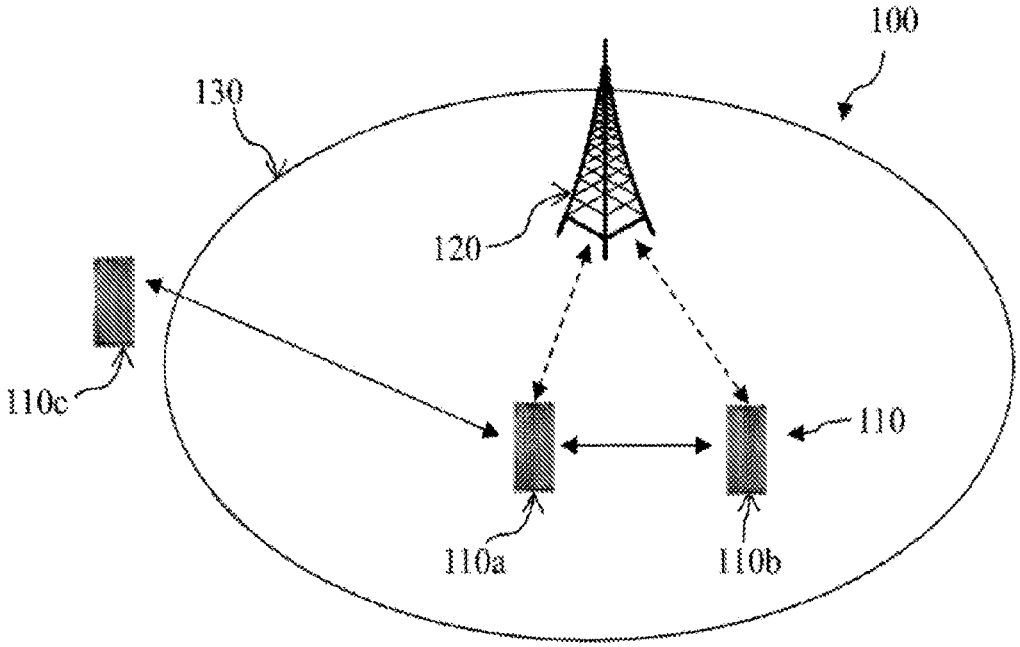
FIG. 1 illustrates a schematic diagram of an exemplary wireless communication system according to some embodiments of the present disclosure.

FIG. 1 illustrates a schematic diagram of an exemplary wireless communication system 100 according to some embodiments of the present disclosure.

As shown in FIG. 1, a wireless communication system 100 may include at least one BS, e.g., BS 120, and at least one UE 110, e.g., UE 110a, UE 110b, and UE 110c. Although a specific number of UEs 110 and one BS 120 are depicted in FIG. 1, it is contemplated that the wireless communication system 100 may also include more BSs and more or fewer UEs in and outside of the coverage of the BSs.

The wireless communication system 100 can be compatible with any type of network that is capable of sending and receiving wireless communication signals. For example, the wireless communication system 100 can be compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The UEs 110 and the BS 120 may support communication based on, for example, 3G, LTE, LTE-advanced (LTE-A), NR, or other suitable protocol(s). In some embodiments of the present disclosure, the BS 120 may also be referred to as an access point, an access terminal, a base, a macro cell, a node-B, an enhanced node B (eNB), a gNB, a home node-B, a relay node, or a device, or described using other terminology used in the art. The UE 110a, UE 110b, or UE 110c may include, for example, but is not limited to, a computing device, a wearable device, a mobile device, an IoT (Internet of Things) device, a vehicle, etc. Moreover, the UE 110a, UE 110b, or UE 110c may be referred to as a subscriber unit, a mobile, a mobile station, a user, a terminal, a mobile terminal, a wireless terminal, a subscriber station, a user terminal, or a device, or described using other terminology used in the art. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100, some UEs (e.g., UE 110a and UE 110b) are within the coverage of the BS 120, which may not be a specific BS 120 shown in FIG. 1 and can be any one of the BSs 120 in a wireless communication system, and some UEs (e.g., UE 110c) are outside of the coverage of the BS 120. For example, in the case that the wireless communication system includes two BSs 120, a UE 110 being within the coverage of any one of the two BSs 120 means that the UE 110 is within the coverage of a BS 120 (i.e., in-coverage) in the wireless communication system; and a UE 110 being outside of the coverage of both BSs 120 means that UE 110 is outside of the coverage of a BS 120 (i.e., out-of-coverage) in the wireless communication system.

Still referring to FIG. 1, the UE 110a and UE 110b may communicate with the BS 120 via, for example, a Uu link (denoted by dotted arrow in FIG. 1). The UE 110a, UE 110b, and UE 110c may communicate with each other (e.g., the UE 110a may communicate with the UE 110b, or the UE 110a may communicate with the UE 110c) via a sidelink (denoted by solid arrow in FIG. 1), and may form a UE group. During a sidelink communication, a transmitting UE (hereinafter referred to as a "Tx UE") may transmit signaling, data, or both to a receiving UE (hereinafter referred to as an "Rx UE"). For example, referring to FIG. 1, a Tx UE (e.g., UE 110a) may transmit data to an Rx UE (e.g., UE 110b or UE 110c).

There are two resource allocation modes for sidelink transmissions. In mode 1, sidelink resource(s) is(are) assigned by a network (e.g., by a BS), for example, via dynamic scheduling or configured grant. In mode 2, sidelink resource(s) is(are) selected from a configured or pre-configured resource pool by a Tx UE itself. Either for mode 1 or for mode 2, after sidelink resource(s) to be used or reserved is(are) determined, the Tx UE may transmit sidelink control information (SCI) on a physical sidelink control channel (PSCCH) which indicates the time-frequency resource(s) in which the Tx UE transmits a physical sidelink shared channel (PSSCH). These SCI transmissions can be detected and used by sensing UE(s) to maintain a record of which resources have been used or reserved by other UEs in the recent past, such that the sensing UE(s) can avoid using the sidelink resource(s) indicated by the SCI, which the sensing UE(s) may deem unavailable resource(s), to avoid collision or interference.

Figure 2:
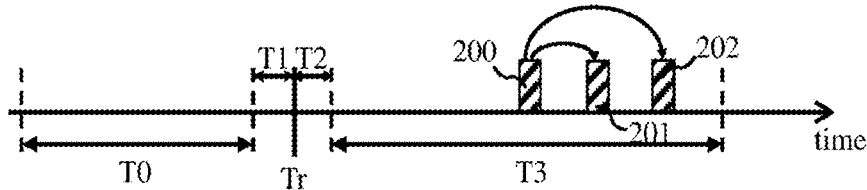
FIG. 2 illustrates a timeline of an exemplary normal sensing and resource selecting procedure.

A Tx UE operating in mode 2 (also referred to as a "mode 2 UE") normally performs a sensing and resource selecting procedure before performing a sidelink transmission to an Rx UE. FIG. 2 illustrates a timeline of an exemplary normal sensing and resource selecting procedure.

As shown in FIG. 2, when a resource selection for a mode 2 UE is triggered (e.g., by traffic arrival or a re-selection trigger), the mode 2 UE may consider a sensing window TO which starts a configured or preconfigured time in the past and finishes shortly (e.g., a first processing period T1) before the trigger time Tr. The mode 2 UE may detect SCI transmission(s) transmitted by surrounding UE(s) in the slots of the sensing window. The mode 2 UE may process the sensing result(s) obtained in the sensing window in the first processing period T1. The sensing window can be either 1100 ms or 100 ms wide, with the intention that the 100 ms option is particularly for aperiodic traffic, and the 1100 ms option is particularly for periodic traffic. The mode 2 UE may also measure the sidelink (SL) reference signal receiving power (RSRP) in the slots of the sensing window. The SL-RSRP may imply the level of interference which would be caused and experienced if the mode 2 UE were to perform transmission in the slots. In NR vehicle-to-everything (V2X) communication, SL-RSRP is a configurable or pre-configurable measurement of either PSSCH-RSRP or PSCCH-RSRP.

Next, the mode 2 UE may select resource(s) for its transmission(s) or retransmission(s) from within a resource selection window T3. The selection window T3 starts shortly (e.g., a second processing period T2) after the trigger time Tr and T2+T3 cannot be longer than the remaining latency budget of the packet to be transmitted. In the second processing period T2, the mode 2 UE may perform any necessary processing that should be performed before a sidelink transmission, including determining a length of the selection window T3. The mode 2 UE may autonomously select time-frequency resource(s) within the selection window T3 and perform sidelink transmission(s) or re-transmission(s) using the selected resource(s), e.g., resources 200, 201, and 202. Resources in the selection window which are reserved for other UE(s) (e.g., indicated by SCI detected in the sensing window) and have SL-RSRP above a threshold can be excluded from being candidates to be selected by the mode 2 UE. The threshold can be set according to the priorities of the traffic of the mode 2 UE and that of the other UE(s). Thus, a higher priority transmission from the mode 2 UE can occupy resources which are reserved by the other UE(s) with sufficiently low SL-RSRP and sufficiently lower priority traffic.

In the example shown in FIG. 2, the mode 2 UE may select to transmit an SCI format and its associated data on the resource 200. Additionally, the SCI format may indicate resource(s) (e.g., resources 201 and 202) to be reserved for the mode 2 UE (e.g., for re-transmission). It should be understood that the durations of TO, T1, T2, and T3 and locations of the resources 200, 201, and 202 shown in FIG. 2 are provided only for illustrative purposes, and should not be construed as limits to the embodiments of the present disclosure.

The SCI format and its associated data can be associated with one or more physical sidelink feedback channel (PSFCH) resources, which can be implicitly indicated by the SCI format as specified in, for example, 3GPP standard document TS 38.213. An Rx UE may transmit hybrid automatic repeat request (HARD) acknowledgement/non-acknowledgement (ACK/NACK) information on the one or more PSFCH resources in response to reception of the SCI format and its associated data. The HARQ-ACK/NACK information may include ACK or NACK. Alternatively, the HARQ-ACK/NACK information may include only NACK.

A UE (e.g., a pedestrian UE (P-UE) such as a mobile phone) can be configured with sidelink discontinuous reception (DRX) off duration(s) to save power. In a DRX-off duration, the UE gets into a sleep mode and does not perform sidelink transmission or reception.

Figure 3:
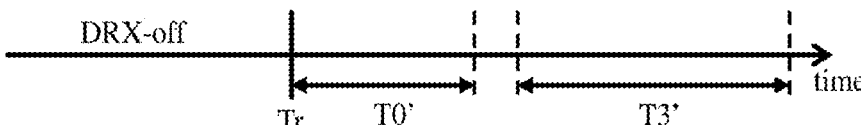
FIG. 3 illustrates a timeline of an exemplary sensing and resource selecting procedure for a UE configured with a discontinuous reception (DRX) off duration according to some embodiments of the present disclosure.

FIG. 3 illustrates a timeline of an exemplary sensing and resource selecting procedure for a UE configured with a sidelink DRX-off duration according to some embodiments of the present disclosure.

In the example shown in FIG. 3, a resource selection for the UE is triggered (e.g., by traffic arrival or a re-selection trigger) at the trigger time Tr, and the UE is in a configured sidelink DRX-off duration when or shortly before the trigger time Tr. As a result, the UE cannot perform sensing in the slots prior to the trigger time Tr as the normal sensing procedure illustrated in FIG. 2. Instead, the UE may perform sensing in a sensing window TO' starting from the trigger time Tr, and then autonomously select time-frequency resource(s) within a selection window T3'. Due to the limitation of the remaining latency budget of the packet to be transmitted, the sensing window TO' and/or the selection window T3' may be shorter than those determined in the normal sensing and resource selecting procedure as illustrated in FIG. 2. Thus, some reserved resources (e.g., periodic reserved resources) may not be detected in the shorter sensing window TO', which may result in more collisions and degrade transmission performance.

The above issue can be solved by obtaining assistant information (including but not limited to sensing result(s) obtained before the trigger time Tr) from other UE(s) which may have an ability to provide the assistant information. According to some embodiments of the present disclosure, a UE having an ability to provide the assistant information may transmit the assistant information to another UE which does not perform sensing prior to a trigger of resource selection or needs assistant information for resource selection (e.g., to avoid the hidden-node or half-duplex issue) automatically or upon a request from the another UE.

Figure 4:
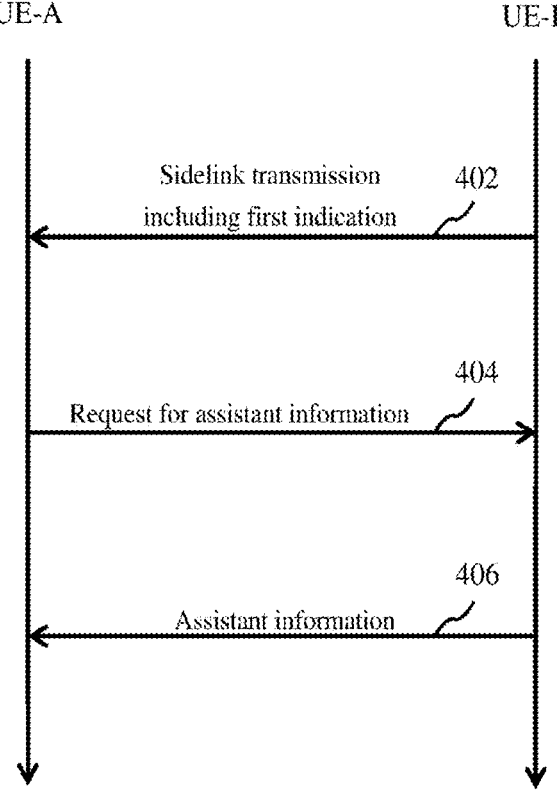
FIG. 4 illustrates a flow chart of an exemplary method for assistant information transmission according to some embodiments of the present disclosure.

FIG. 4 illustrates a flow chart of an exemplary method for assistant information transmission according to some embodiments of the present disclosure. The method can be performed by UE-A and UE-B. The UE-A and the UE-B can be any UE described herein (e.g., the UE 110a, 110b, or 110c in FIG. 1). For example, The UE-A and the UE-B can operate in mode 2. The UE-A can be a UE which does not perform sensing prior to a trigger of resource selection or needs assistant information for resource selection (e.g., to avoid the hidden-node or half-duplex issue). The UE-B can be a UE which may have an ability to provide assistant information (including but not limited to sensing result(s) obtained in a normal sensing procedure) to other UE(s).

As shown in FIG. 4, the UE-B may transmit a sidelink transmission including a first indication to indicate whether the UE-B has an ability of providing assistant information for resource selection, at step 402. Although not shown in FIG. 4, the UE-B may perform a normal sensing procedure before step 402, and the assistant information may include but not limited to the sensing result obtained in the normal sensing procedure. In some embodiments of the present disclosure, the sidelink transmission may include both control information (e.g., an SCI format) and associated data. In some other embodiments of the present disclosure, the sidelink transmission may include control information only. The first indication can be one bit in the SCI format in the sidelink transmission. For example, the SCI format may have a one-bit field, where a value of '1' in this field may represent that the UE-B can provide the assistant information, and a value of '0' in this field may represent that the UE-B cannot provide the assistant information.

The UE-A may receive the sidelink transmission including the first indication from the UE-B. In an embodiment of the present disclosure, the sidelink transmission may be targeted to one or more UEs including the UE-A. In another embodiment of the present disclosure, the sidelink transmission may be targeted to one or more UEs other than the UE-A but detected by the UE-A during a sensing procedure. The sensing procedure can be started from a slot when a resource selection for the UE-A is triggered.

In response to receiving the first indication which indicates that the UE-B has the ability of providing the assistant information, the UE-A may transmit a request for the assistant information to the UE-B (step 404) when the UE-A needs the assistant information for resource selection. According to some embodiments of the present disclosure, the request can be transmitted on one or more feedback resources associated with the sidelink transmission received at step 402.

As described above, the sidelink transmission may have associated feedback resource(s), which can be implicitly indicated by the SCI format in the sidelink transmission as specified in, for example, 3GPP standard document TS 38.213. When the sidelink transmission is a unicast or groupcast transmission, the HARQ-ACK/NACK information in response to reception of the sidelink transmission can be transmitted on the associated feedback resource(s). According to some embodiments of the present disclosure, the one or more feedback resources used to transmit the request for assistant information can be allocated to have at least one of (1) a pre-defined or pre-configured frequency domain offset or (2) a pre-defined or pre-configured time domain offset with respect to the associated feedback resource(s) for HARQ-ACK/NACK information. As a non-limiting example, when the first associated feedback resource for HARQ-ACK/NACK information is the physical resource block (PRB) in symbol i and sub-channel j, the PRB in symbol i−1 and sub-channel j, the PRB in symbol i and sub-channel j−1, or the PRB in symbol i−1 and sub-channel j−1 can be allocated to transmit the request for assistant information. As another non-limiting example, when the last associated feedback resource for HARQ-ACK/NACK information is the physical resource block (PRB) in symbol i and sub-channel j, the PRB in symbol i+1 and sub-channel j, the PRB in symbol i and sub-channel j+1, or the PRB in symbol i+1 and sub-channel j+1 can be allocated to transmit the request for assistant information.

According to some embodiments of the present disclosure, the one or more feedback resources used to transmit the request for assistant information can be the same as the associated feedback resource(s) for HARQ-ACK/NACK information. For example, when the sidelink transmission is a broadcast transmission, there is no need to transmit HARQ-ACK/NACK information, and thus the associated feedback resource(s) for HARQ-ACK/NACK information can be used to transmit the request for assistant information.

According to some embodiments of the present disclosure, different feedback resources can be allocated to UEs with different traffic priority levels or different packet sizes (i.e., numbers of sub-channels). That is, the one or more feedback resources used by the UE-A to transmit the request for assistant information may correspond to the traffic priority level or the packet size of the UE-A. For example, a first feedback resource can be used by a UE (with a first traffic priority level) to request assistant information corresponding to a traffic priority level higher than the first traffic priority level, a second feedback resource can be used by a UE (with a second traffic priority level) to request assistant information corresponding to a traffic priority level higher than the second traffic priority level, and so on. When the UE-B receives a request for assistant information from a specific UE-A on a specific feedback resource, it can determine the traffic priority level or the packet size of the specific UE-A and provide corresponding assistant information.

As shown in FIG. 4, the UE-B may transmit the assistant information to the UE-A in response to receiving the request from the UE-A, at step 406. According to some embodiments of the present disclosure, the sidelink transmission transmitted at step 402 may include a second indication (e.g., included in the SCI format) which indicates reserved resource(s) (e.g., for re-transmission), and the assistant information can be transmitted on at least one of the reserved resource(s).

To indicate which reserved resource(s) is(are) used to transmit the assistant information, a third indication can be introduced and transmitted to the UE-A. In an embodiment of the present disclosure, the third indication can be one bit in an SCI format. For example, the SCI format may have a one-bit field, where a value of '1' in this field may represent that the assistant information is transmitted on the PSSCH resource scheduled by the SCI format, and a value of '0' in this field may represent that the assistant information is not transmitted on the PSSCH resource scheduled by the SCI format. According to some embodiments of the present disclosure, a pre-defined or pre-configured portion of the at least one reserved resource can be punctured to transmit the assistant information. For example, the assistant information can be transmitted in the 2$^{nd}$-stage SCI region, or in the data region (e.g., the last symbol of the data region).

In the case that the sidelink transmission transmitted at step 402 includes control information only, all the reserved resource(s) can be used to transmit the assistant information. Thus, the third indication associated with each of the reserved resource(s) can be set to indicate that the assistant information is transmitted on the associated reserved resource. Alternatively, the third indication can be omitted in such case.

After receiving the assistant information from the UE-B, the UE-A may perform resource selection by taking into account the assistant information from the UE-B.

According to some embodiments of the present disclosure, the UE-B can transmit the assistant information without receiving a request from the UE-A. Also, the UE-B may need not to transmit the first indication to indicate its ability of providing the assistant information. For example, when the UE-B is transmitting a sidelink transmission in a groupcast or broadcast manner, it may provide the assistant information from its perspective in the sidelink transmission. The sidelink transmission may further include an indication to indicate that the assistant information is transmitted in the sidelink transmission. In an embodiment of the present disclosure, the indication can be one bit in an SCI format in the sidelink transmission. For example, the SCI format may have a one-bit field, where a value of '1' in this field may represent that the assistant information is transmitted in the sidelink transmission, and a value of '0' in this field may represent that the assistant information is not transmitted in the sidelink transmission. According to some embodiments of the present disclosure, a pre-defined or pre-configured portion of the sidelink transmission can be punctured to transmit the assistant information. For example, the assistant information can be transmitted in the $2^{nd}$-stage SCI region, or in the data region (e.g., the last symbol of the data region). The assistant information included in the sidelink transmission can be used by a UE (e.g., the UE-A) which receives the sidelink transmission and needs the assistant information for resource selection (e.g., a UE intending to transmit data while having no enough sensing time).

Figure 5:
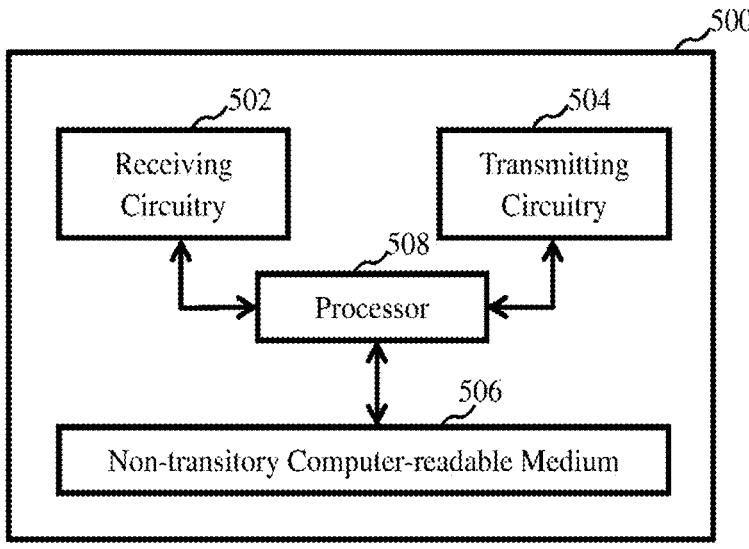
FIG. 5 illustrates an exemplary block diagram of an apparatus according to some embodiments of the present disclosure.

FIG. 5 illustrates an exemplary block diagram of an apparatus 500 according to some embodiments of the present disclosure. In some embodiments of the present disclosure, the apparatus 500 may be or include a first UE (e.g., the UE-A in FIG. 4) or other devices having similar functionality. In some embodiments, the apparatus 500 can be configured to perform the method illustrated in FIG. 4.

As shown in FIG. 5, the apparatus 500 may include at least one receiving circuitry 502, at least one transmitting circuitry 504, at least one non-transitory computer-readable medium 506, and at least one processor 508 coupled to the at least one receiving circuitry 502, the at least one transmitting circuitry 504, the at least one non-transitory computer-readable medium 506. While shown to be coupled to each other via the at least one processor 508 in the example of FIG. 5, the at least one receiving circuitry 502, the at least one transmitting circuitry 504, the at least one non-transitory computer-readable medium 506, and the at least one processor 508 may be coupled to one another in various arrangements. For example, the at least one receiving circuitry 502, the at least one transmitting circuitry 504, the at least one non-transitory computer-readable medium 506, and the at least one processor 508 may be coupled to each other via one or more local buses (not shown for simplicity).

Although in FIG. 5, elements such as receiving circuitry 502, transmitting circuitry 504, non-transitory computer-readable medium 506, and processor 508 are described in the singular, the plural is contemplated unless limitation to the singular is explicitly stated. In some embodiments of the present disclosure, the at least one receiving circuitry 502 and the at least one transmitting circuitry 504 may be combined into a single device, such as a transceiver. In certain embodiments of the present disclosure, the apparatus 500 may further include an input device, a memory, and/or other components.

In some embodiments of the present disclosure, the at least one non-transitory computer-readable medium 506 may have stored thereon computer-executable instructions which are programmed to cause the at least one processor 508 to implement the steps of the methods according to embodiments of the present disclosure, for example as described in view of FIG. 4, with the at least one receiving circuitry 502 and the at least one transmitting circuitry 504. For example, when executed, the instructions may cause the at least one processor 508 to receive, with the at least one receiving circuitry 502, a sidelink transmission including a first indication to indicate whether a second UE (e.g., the UE-B in FIG. 4) has an ability of providing assistant information for resource selection. The instructions may further cause the at least one processor 508 to transmit, with the at least one transmitting circuitry 504, a request for the assistant information on one or more feedback resources associated with the sidelink transmission, in response to the first indication indicating that the second UE has the ability of providing the assistant information. As another example, when executed, the instructions may cause the at least one processor 508 to receive, with the at least one receiving circuitry 502, a sidelink transmission including assistant information for resource selection, wherein the sidelink transmission may further includes an indication to indicate that the assistant information is transmitted in the sidelink transmission.

Figure 6:
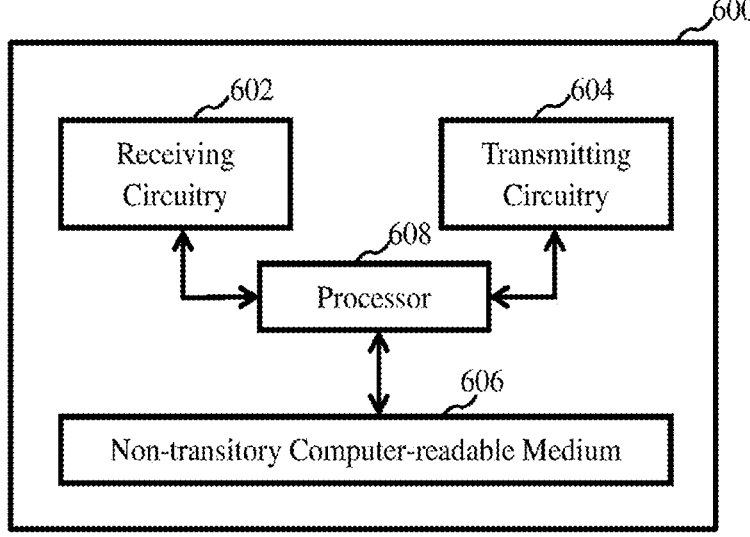
FIG. 6 illustrates an exemplary block diagram of another apparatus according to some embodiments of the present disclosure.

FIG. 6 illustrates an exemplary block diagram of an apparatus 600 according to some embodiments of the present disclosure. In some embodiments of the present disclosure, the apparatus 600 may be or include a second UE (e.g., the UE-B in FIG. 4) or other devices having similar functionality. In some embodiments, the apparatus 600 can be configured to perform the method illustrated in FIG. 4.

As shown in FIG. 6, the apparatus 600 may include at least one receiving circuitry 602, at least one transmitting circuitry 604, at least one non-transitory computer-readable medium 606, and at least one processor 608 coupled to the at least one receiving circuitry 602, the at least one transmitting circuitry 604, the at least one non-transitory computer-readable medium 606. While shown to be coupled to each other via the at least one processor 608 in the example of FIG. 6, the at least one receiving circuitry 602, the at least one transmitting circuitry 604, the at least one non-transitory computer-readable medium 606, and the at least one processor 608 may be coupled to one another in various arrangements. For example, the at least one receiving circuitry 602, the at least one transmitting circuitry 604, the at least one non-transitory computer-readable medium 606, and the at least one processor 608 may be coupled to each other via one or more local buses (not shown for simplicity).

Although in FIG. 6, elements such as receiving circuitry 602, transmitting circuitry 604, non-transitory computer-readable medium 606, and processor 608 are described in the singular, the plural is contemplated unless limitation to the singular is explicitly stated. In some embodiments of the present disclosure, the at least one receiving circuitry 602 and the at least one transmitting circuitry 604 may be combined into a single device, such as a transceiver. In certain embodiments of the present disclosure, the apparatus 600 may further include an input device, a memory, and/or other components.

In some embodiments of the present disclosure, the at least one non-transitory computer-readable medium 606 may have stored thereon computer-executable instructions which are programmed to cause the at least one processor 608 to implement the steps of the methods according to embodiments of the present disclosure, for example as described in view of FIG. 4, with the at least one receiving circuitry 602 and the at least one transmitting circuitry 604. For example, when executed, the instructions may cause the at least one processor 608 to transmit, with the at least one transmitting circuitry 604, a sidelink transmission including a first indication to indicate whether the second UE has an ability of providing assistant information for resource selection. The instructions may further cause the at least one processor 608 to receive, with the at least one receiving circuitry 602, from a first UE (e.g., the UE-A in FIG. 4), a request for the assistant information on one or more feedback resources associated with the sidelink transmission, in response to the first indication indicating that the second UE has the ability of providing the assistant information. As another example, when executed, the instructions may cause the at least one processor 608 to transmit, with the at least one transmitting circuitry 604, a sidelink transmission including assistant information for resource selection, wherein the sidelink transmission may further includes an indication to indicate that the assistant information is transmitted in the sidelink transmission.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, or program code. The storage devices may be tangible, non-transitory, or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Furthermore, the described features, structures, or characteristics of the embodiments may be combined in any suitable manner. While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A first user equipment (UE) for wireless communication, comprising:

at least one memory; and at least one processor coupled with the at least one memory and configured to cause the first UE to:

receive a sidelink transmission comprising a first indication to indicate whether a second UE has an ability of providing assistant information for resource selection;

in response to the first indication indicating that the second UE has the ability of providing the assistant information, determine one or more resources allocated for transmission of feedback associated with the sidelink transmission; and transmit a request for the assistant information on the one or more resources.

2. The first UE of claim 1, wherein the first indication is one bit in a sidelink control information (SCI) format in the sidelink transmission.

3. The first UE of claim 1, wherein the one or more resources have at least one of:

a pre-defined or pre-configured frequency domain offset, or a pre-defined or pre-configured time domain offset, with respect to a feedback resource for hybrid automatic repeat request (HARQ) acknowledgement/non-acknowledgement (ACK/NACK) information associated with the sidelink transmission.

4. The first UE of claim 1, wherein the one or more resources comprise resources for hybrid automatic repeat request (HARQ) acknowledgement/non-acknowledgement (ACK/NACK) information associated with the sidelink transmission.

5. The first UE of claim 1, wherein the one or more resources correspond to a traffic priority level or a packet size of the first UE.

6. The first UE of claim 1, wherein the sidelink transmission further comprises a second indication to indicate one or more reserved resources, and the at least one processor is further configured to cause the first UE to receive, on at least one reserved resource of the one or more reserved resources, the assistant information in response to the request.

7. The first UE of claim 6, wherein the at least one processor is further configured to cause the first UE to receive a third indication to indicate that the assistant information is transmitted on the at least one reserved resource.

8. The first UE of claim 7, wherein the third indication is one bit in a sidelink control information (SCI) format.

9. The first UE of claim 6, wherein the assistant information is received in a pre-defined or pre-configured portion of the at least one reserved resource.

10. A first user equipment (UE) for wireless communication, comprising:

at least one memory; and at least one processor coupled with the at least one memory and configured to cause the first UE to:

in response to a first sidelink transmission comprising a first indication indicating that a second UE has an ability of providing assistant information, determine one or more resources allocated for transmission of feedback associated with the first sidelink transmission;

transmit a request for the assistant information for resource selection on the one or more resources; and receive a second sidelink transmission comprising the assistant information, wherein the second sidelink transmission further comprises an indication that the assistant information is transmitted in the second sidelink transmission.

11. The first UE of claim 10, wherein the indication is one bit in a sidelink control information (SCI) format in the second sidelink transmission.

12. The first UE of claim 10, wherein the assistant information is received in a pre-defined or pre-configured portion of the second sidelink transmission.

13. A first user equipment (UE) for wireless communication, comprising:

at least one memory; and at least one processor coupled with the at least one memory and configured to cause the first UE to:

transmit a sidelink transmission comprising a first indication to indicate whether the first UE has an ability of providing assistant information for resource selection;

in response to the first indication indicating that the first UE has the ability of providing the assistant information, determine one or more resources allocated for transmission of feedback associated with the sidelink transmission; and receive, from a second UE, a request for the assistant information on the one or more resources.

14. A method performed by a first user equipment (UE), the method comprising:

receiving a sidelink transmission comprising a first indication to indicate whether a second UE has an ability of providing assistant information for resource selection;

in response to the first indication indicating that the second UE has the ability of providing the assistant information, determining one or more resources allocated for transmission of feedback associated with the sidelink transmission; and transmitting a request for the assistant information on the one or more resources.

15. The method of claim 14, wherein the first indication is one bit in a sidelink control information (SCI) format in the sidelink transmission.

16. The method of claim 14, wherein the one or more resources have at least one of:

a pre-defined or pre-configured frequency domain offset, or a pre-defined or pre-configured time domain offset, with respect to a feedback resource for hybrid automatic repeat request (HARQ) acknowledgement/non-acknowledgement (ACK/NACK) information associated with the sidelink transmission.

17. The method of claim 14, wherein the one or more resources comprise resources for hybrid automatic repeat request (HARQ) acknowledgement/non-acknowledgement (ACK/NACK) information associated with the sidelink transmission.

18. The method of claim 14, wherein the one or more resources correspond to a traffic priority level or a packet size of the first UE.

19. The method of claim 14, wherein the sidelink transmission further comprises a second indication to indicate one or more reserved resources, the method further comprising:

receiving, on at least one reserved resource of the one or more reserved resources, the assistant information in response to the request.

20. The method of claim 19, further comprising:

receiving a third indication to indicate that the assistant information is transmitted on the at least one reserved resource.

\* \* \* \* \*